United States Patent
Watanabe et al.

(10) Patent No.: US 9,030,775 B2
(45) Date of Patent: May 12, 2015

(54) IMPACT RESISTANT ROTATING DEVICE WITH INCREASED-THICKNESS PORTION RELATIONSHIP AND SUCTION PLATE CONFIGURATION

(75) Inventors: Takanori Watanabe, Shizuoka (JP); Takuji Yamada, Shizuoka (JP); Susumu Ando, Shizuoka (JP); Hiroshi Iwai, Shizuoka (JP)

(73) Assignee: Samsung Electro-Mechanics Japan Advanced Technology Co., Ltd., Shizuoka (JP)

( * ) Notice: Subject to any disclaimer, the term of this patent is extended or adjusted under 35 U.S.C. 154(b) by 406 days.

(21) Appl. No.: 13/104,870

(22) Filed: May 10, 2011

(65) Prior Publication Data

US 2011/0279925 A1 Nov. 17, 2011

(30) Foreign Application Priority Data

May 11, 2010 (JP) .................................. 2010-109459

(51) Int. Cl.
| | |
|---|---|
| G11B 19/20 | (2006.01) |
| G11B 25/04 | (2006.01) |
| H02K 5/04 | (2006.01) |
| G11B 33/14 | (2006.01) |

(52) U.S. Cl.
CPC ............ G11B 25/043 (2013.01); G11B 33/148 (2013.01)

(58) Field of Classification Search
CPC .............................. G11B 19/2036; H02K 5/04
USPC ............ 360/98.07, 99.08; 310/90, 90.5, 67 R
See application file for complete search history.

(56) References Cited

U.S. PATENT DOCUMENTS

| | | | | | |
|---|---|---|---|---|---|
| 5,256,922 | A | * | 10/1993 | Tanaka et al. ............... | 310/67 R |
| 5,545,937 | A | * | 8/1996 | Dunfield et al. ............. | 310/90.5 |
| 5,623,382 | A | * | 4/1997 | Moritan et al. ............. | 360/99.08 |
| 5,635,781 | A | * | 6/1997 | Moritan ....................... | 310/67 R |
| 7,280,311 | B1 | * | 10/2007 | Ou-Yang et al. ............ | 360/97.16 |
| 2002/0093268 | A1 | * | 7/2002 | Petersen ....................... | 310/254 |
| 2002/0135260 | A1 | * | 9/2002 | Petersen ....................... | 310/216 |
| 2006/0002638 | A1 | * | 1/2006 | Ichiyama ...................... | 384/100 |

(Continued)

FOREIGN PATENT DOCUMENTS

| | | |
|---|---|---|
| JP | 03070442 A | 3/1991 |
| JP | H07177720 A | 7/1995 |

(Continued)

OTHER PUBLICATIONS

Notification of Reasons for Refusal; Ref. No. A010-02; Dispatch No. 074069; Issued in corresponding Patent Application No. 2010-109459; Dated Feb. 5, 2014 (with English translation).

(Continued)

*Primary Examiner* — Craig A. Renner
(74) *Attorney, Agent, or Firm* — Z IP Law PLLC

(57) ABSTRACT

In a disk drive device, a magnetic recording disk is mounted on a hub. A base rotatably supports the hub via a bearing unit. The base has a ring-shaped wall that surrounds the bearing unit and that protrudes towards the hub. A laminated core is fixed to the base. The laminated core has a ring portion and twelve teeth that radially outwardly extend from the ring portion. Coils are wound around the twelve teeth. The base includes an increasing-thickness portion formed so that the less the distance between a part of the increasing-thickness portion and the ring-shaped wall is, the thicker the part of the increasing-thickness portion becomes.

15 Claims, 8 Drawing Sheets

(56) References Cited

U.S. PATENT DOCUMENTS

| | | | |
|---|---|---|---|
| 2007/0001531 A1* | 1/2007 | Nagai | 310/90 |
| 2008/0056627 A1* | 3/2008 | Horng et al. | 384/100 |
| 2008/0056630 A1* | 3/2008 | Horng et al. | 384/276 |
| 2008/0068755 A1* | 3/2008 | Aoyagi et al. | 360/137 |
| 2010/0226046 A1* | 9/2010 | Saito et al. | 360/245.2 |
| 2010/0264763 A1* | 10/2010 | Kull | 384/107 |
| 2011/0033144 A1* | 2/2011 | Kodama | 384/112 |
| 2011/0044570 A1* | 2/2011 | Horng et al. | 384/535 |
| 2011/0109991 A1* | 5/2011 | Nishitani | 360/99.12 |
| 2011/0134566 A1* | 6/2011 | Sekii et al. | 360/99.08 |
| 2011/0154875 A1* | 6/2011 | Fukuzako et al. | 72/67 |
| 2011/0181986 A1* | 7/2011 | Kodama et al. | 360/224 |

FOREIGN PATENT DOCUMENTS

| | | | | |
|---|---|---|---|---|
| JP | 2003047222 A | 2/2003 | | |
| JP | 2003324929 A | 11/2003 | | |
| JP | 2003333797 A | 11/2003 | | |
| JP | 2005098393 A | 4/2005 | | |
| JP | 2005143227 A | 6/2005 | | |
| JP | 2005273781 A | 10/2005 | | |
| JP | 2006042584 A | 2/2006 | | |
| JP | 2006071087 A | 3/2006 | | |
| JP | 2007-198555 | 8/2007 | | |
| JP | 2007198555 A | * 8/2007 | | F16C 33/10 |
| JP | 2007282374 A | 10/2007 | | |
| JP | 2007327528 A | 12/2007 | | |

OTHER PUBLICATIONS

Notification of Reasons for Refusal; Ref. No. A010-02; Dispatch No. 368555; Issued in corresponding Patent Application No. 2010-109459; Dated Jul. 3, 2014 (with English translation).

* cited by examiner

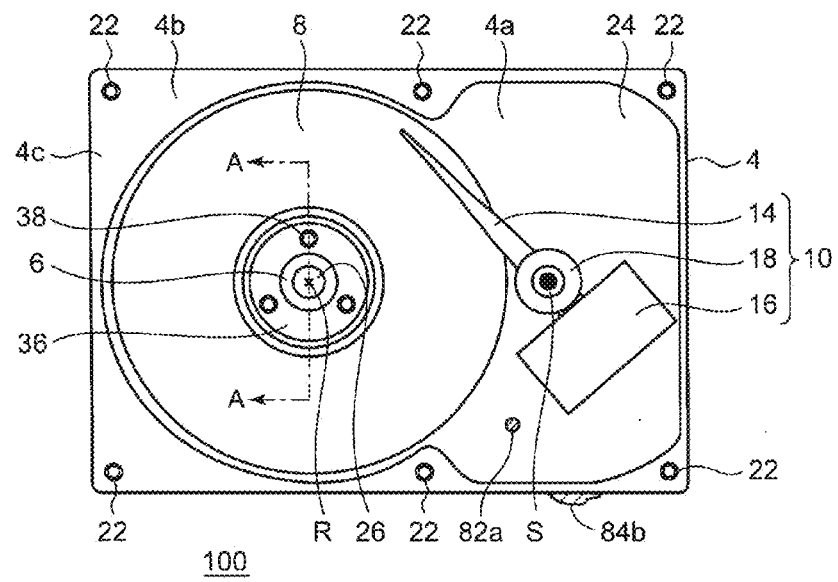
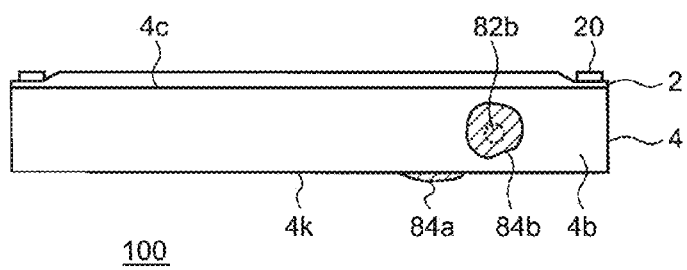
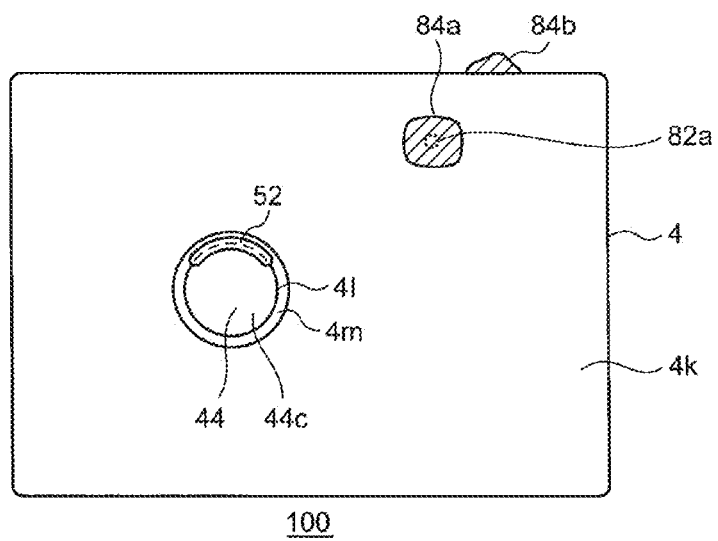

P=1013hPa

P=30Pa

IMPACT RESISTANT ROTATING DEVICE WITH INCREASED-THICKNESS PORTION RELATIONSHIP AND SUCTION PLATE CONFIGURATION

CROSS-REFERENCE TO RELATED APPLICATION

This application is based upon and claims the benefit of priority from the prior Japanese Patent Application No. 2010-109459, filed on May 11, 2010, the entire content of which is incorporated herein by reference.

BACKGROUND OF THE INVENTION

1. Field of the Invention

The present invention relates to a rotating device and a method for manufacturing a rotating device.

2. Description of the Related Art

Disk drive devices, such as hard disk drives, have become miniaturized. The capacity of a disk drive device has also been increased. Such disk drive devices have been installed in various types of electronic devices. In particular, such disk drive devices have been installed in portable electronic devices such as laptop computers or portable music players. With regard to disk drive devices that are installed in portable electronic devices, their impact resistance has been required to be improved so that the disk drive devices can withstand impacts, such as those due to dropping, compared with the case of stationary electronic devices such as desk-top personal computers.

On the other hand, in general, portable electronic devices have been required to be made thinner, smaller, and lighter. Therefore, disk drive devices that are installed in portable electronic devices have also been required to be made thinner, smaller, and lighter. However, it is possible that the impact resistance decreases in the course of making the disk drive devices thinner, smaller, and lighter. It can be said that there is a trade-off imposed on the disk drive devices that are installed in portable electronic devices.

For example, in the case where the disk drive device is used for a desk-top PC, any impact applied to the disk drive device would be small, and it would not be likely that the disk drive device malfunctions in normal usage. However, in the case where the disk drive device is used for portable electronic devices, the disk drive device may receive a large impact such as those due to dropping. There would be many cases where a large impact is applied to the disk drive device. Therefore, there is a possibility that the disk drive device malfunctions in use unless the disk drive device has considerable impact resistance.

In order to cope with this, the prior art installs a fluid dynamic bearing unit (hereinafter referred to as "FDB") in a disk drive device as disclosed in Japanese Patent Application Publication No. 2007-198555. In this FDB, a flange portion is sandwiched between an extended portion of a sleeve and the end surface of a housing. The flange portion is formed in an inner cylindrical region. A lubricant is filled in between the flange portion and the extended portion of the sleeve, and the lubricant is also filled in between the flange portion and the end surface of the housing.

SUMMARY OF THE INVENTION

Under the above circumstances, the inventors of the present invention encountered the following concern: as shown in Japanese Patent Application Publication No. 2007-198555, for example, for a typical disk drive device, the FDB is fixed to a base, and a hub is rotatably supported with respect to the base by the FDB. A magnetic recording disk is mounted on the hub and rotated. When acceleration due to an impact is applied to such a disk drive device, a stress is applied near the center of the base. The strength of the stress corresponds to the value given by multiplying the acceleration due to the impact by sum of the masses of the magnetic recording disk, the hub, the FDB, a core, and the coil. In particular, this stress tends to concentrate at the root of an annular wall portion of the base that upwardly protrudes and that supports the FDB.

In order to maintain the impact resistance of the disk drive device, the base has to withstand the stress that concentrates at the root of the annular wall portion. Therefore, in prior art, it is necessary to make the base thick enough to withstand this stress. However, for the purpose of thinning the disk drive device, this thickness may be a bottleneck.

The present invention addresses these disadvantages, and a general purpose of one embodiment of the present invention is to provide a rotating device that has good impact resistance.

An embodiment of the present invention relates to a rotating device. The rotating device comprises: a hub on which a recording disk is to be mounted; a base rotatably supporting the hub via a bearing unit, the base having a ring-shaped wall that surrounds the bearing unit and that protrudes towards the hub; a core fixed to the base, the core having a ring portion and a plurality of teeth that radially extend from the ring portion; and coils wound around the plurality of teeth. The base includes an increasing-thickness portion formed so that the less the distance between a part of the increasing-thickness portion and the ring-shaped wall is, the thicker the part of the increasing-thickness portion becomes.

Optional combinations of the aforementioned constituting elements and implementations of the invention in the form of methods, apparatuses, or systems may also be practiced as additional modes of the present invention.

BRIEF DESCRIPTION OF THE DRAWINGS

Embodiments will now be described, by way of example only, with reference to the accompanying drawings, which are meant to be exemplary, not limiting, and wherein like elements are numbered alike in several figures, in which:

FIG. 1A shows a top view of the disk drive device according to an embodiment;

FIG. 1B shows a side view of the disk drive device according to the embodiment;

FIG. 1C shows a bottom view of the disk drive device according to the embodiment;

DETAILED DESCRIPTION OF THE INVENTION

Figure 2:
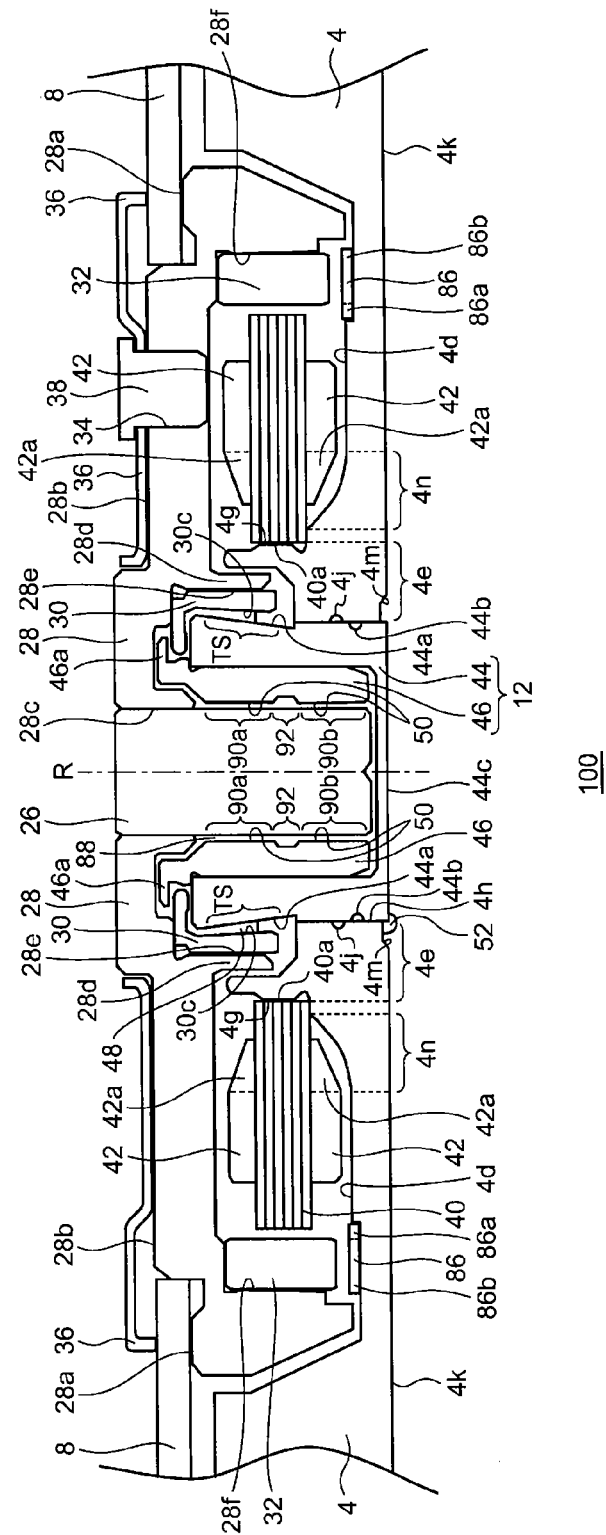
FIG. 2 is a view that is sectioned along the line A-A, as illustrated in FIG. 1A.

The invention will now be described by reference to the preferred embodiments This does not intend to limit the scope of the present invention but to exemplify the invention. The size of the component in each figure may be changed in order to aid understanding. Some of the components in each figure may be omitted if they are not important for explanation.

The disk drive device according to the embodiment of the present invention is an example of a rotating device and is preferably used as a hard disk drive that has a magnetic recording disk.

In the disk drive device according to the embodiment, the thickness of the base gradually is increased as it gets close to a portion of the base that surrounds and supports a bearing unit. This will improve the impact resistance of the base.

(A Disk Drive Device 100)

FIG. 1A is a top view of the disk drive device 100 according to the embodiment. In FIG. 1A, the disk drive device 100 is shown without a top cover 2 in order to show the inside of the disk drive device 100. The disk drive device 100 comprises: a base 4; a rotor 6; a magnetic recording disk 8; a data read/write unit 10; and the top cover 2.

Hereinafter, it is assumed that the side of the base 4 on which the rotor 6 is installed is the upper side.

The magnetic recording disk 8 is mounted on the rotor 6, and rotates with the rotor 6. The rotor 6 is rotatably mounted to the base 4 through the bearing unit 12, which is not shown in FIG. 1A. The base 4 is produced by die-casting an alloy of aluminum. The base 4 includes: a bottom plate 4a forming the bottom portion of the disk drive device 100; and an outer circumference wall 4b formed along the outer circumference of the bottom plate 4a so that the outer circumference wall 4b surrounds an installation region of the magnetic recording disk 8. Six screw holes 22 are formed on the upper surface 4c of the outer circumference wall 4b.

The data read/write unit 10 includes: a read/write head (not shown); a swing arm 14; a voice coil motor 16; and a pivot assembly 18. The read/write head is attached to the tip of the swing arm 14. The read/write head records data onto and reads out data from the magnetic recording disk 8. The pivot assembly 18 swingably supports the swing arm 14 with respect to the base 4 around the head rotation axis S. The voice coil motor 16 swings the swing arm 14 around the head rotation axis S and moves the read/write head to the desired position on the upper surface of the magnetic recording disk 8. The voice coil motor 16 and the pivot assembly 18 are constructed using a known technique for controlling the position of the head.

FIG. 1B is a side view of the disk drive device 100 according to the embodiment. The top cover 6 is fixed onto the upper surface 4c of the outer circumference wall 4b of the base 4 using six screws 20. The six screws 20 correspond to the six screw holes 22, respectively. In particular, the top cover 2 and the upper surface 4c of the outer circumference wall 4b are fixed together so that the joint portion between both does not create a leak into the inside of the disk drive device 100. The inside of the disk drive device 100, for example, is a clean space 24 surrounded by the bottom plate 4a of the base 4 and the outer circumference wall 4b of the base 4 and the top cover 2. This clean space 24 is designed so that the clean space 24 is sealed, in other words, there is neither leakage from the outside or to the outside. The clean space 24 is filled with clean gas, with particles removed. This can suppress adhesion of contaminants, such as particles, onto the magnetic recording disk 8 and can increase the reliability of the disk drive device 100.

The clean gas that is filled in the clean space 24 may, for example, be air. Alternatively the clean gas may include, by a certain ratio, a gas comprised of molecules of less molecular weight such as Helium molecules (each of which is a monatomic molecule). Alternatively the clean gas may be substantially pure Helium gas.

The rotating magnetic recording disk 8 tends to levitate due to wind pressure caused by the rotation of the magnetic recording disk 8. In the case where this buoyancy force is strong, in order to avoid touching, it is necessary to design the disk drive device so that the gap between the read/write head and the magnetic recording disk 8 is relatively wide. However, in the case where the clean gas filled in the clean space 24 includes Helium gas, the less molecular weight of Helium may make the wind pressure during the rotation of the magnetic recording disk 8 relatively small. Therefore, it would be possible to narrow the gap between the read/write head and the magnetic recording disk 8, thereby increasing the amount of recordable data per unit area of the magnetic recording disk 8.

In principle, the lower limit of the gap between the read/write head and the magnetic recording disk 8 corresponds to the size of the molecule of the clean gas filled in the clean space 24. Therefore, the fact that the clean gas includes relatively large amount of small molecules may make it possible to further narrow the gap.

FIG. 1C is a bottom view of the disk drive device 100 according to the embodiment. Referring to FIGS. 1A, 1B and 1C, for the purpose of fixing a pin made of stainless steel or for the other purposes, a first through hole 82a is formed in the bottom plate 4a of the base 4 and a second through hole 82b is formed in the outer circumference wall 4b. A pin is inserted into the first through hole 82a or the second through hole 82b and mechanically is fixed there. In the case where the bottom plate 4a or the outer circumference wall 4b is thinned in order to thin or trim weight of the disk drive device 100, the amount of leakage through the first through hole 82a or the second through hole 82b may be increased. In particular, in the case where the clean gas filled in the clean space 24 includes a great amount of Helium gas, the amount of leakage may be larger than the case where the clean gas includes a great amount of a gas of larger molecular weight. The large amount of leakage would substantially change, for example within a period of time used generally for aging tests, the total amount of the clean gas filled in the clean space 24 or the ratio of Helium gas. If at least one of these parameters changes, then the gap between the read/write head and the magnetic recording disk 8 may change. This change of the gap may prevent the reading/writing of data.

To cope with this, with regard to the lower surface 4k of the base 4, a first seal member 84a is provided along the edge of the first through hole 82a. In particular, the first seal member 84a covers the first through hole 82a. With regard to the side surface 4ba of the outer circumference wall 4b, a second seal member 84b is provided along the edge of the second through hole 82b. In particular, the second seal member 84b covers the second through hole 82b. Each of the first and second seal members 84a, 84b may be provided, for example, by forming a sheet-like material including resin into a predetermined shape (for example, a disk) and fixing it by a glue. This preferably may facilitate the work. Alternatively, each of the first and second seal members 84a, 84b may be provided by applying hardening resin in liquid form and then hardening the applied hardening resin using heat or UV radiation. This preferably may suppress the removal of the seal member due to impact.

After providing the first seal member 84a or the second seal member 84b, an aging test may be performed. In this aging test, one checks the change of the total amount of the clean gas filled in the clean space 24 or the change of the ratio of Helium gas, after a predetermined period of time has passed. If, in this aging test, the amount of change with respect to the device under test is found to be equal to or more than a predetermined reference amount of change, the device under test may be removed as a seal malfunction.

According to the above, the reliability of the disk drive device 100 may be increased.

FIG. 2 is a view that is sectioned along the line A-A, as illustrated in FIG. 1A. The rotor 6 includes: a shaft 26; a hub 28; a thrust ring 30; and a cylindrical magnet 32. The magnetic recording disk 8 is mounted on a disk-mount surface 28a of the hub 28. Three screw holes 34 for affixing a disk are arranged on the upper surface 28b of the hub 28 at 120-degree intervals around the rotational axis R of the rotor 6. The clamper 36 is pressed against the upper surface 28b of the hub 28 by three screws 38 for affixing a disk, which are screwed in the corresponding three screw holes 34 for affixing a disk. The clamper 36 presses the magnetic recording disk 8 against the disk-mount surface 28a of the hub 28.

The hub 28 is made of soft-magnetic steel such as SUS430F. The hub 28 is formed to be predetermined cup-like shape by, for example, the press working or cutting of a steel plate. For example, the hub 28 may preferably be made of the stainless steel (DHS1) provided by Daido Steel Co., Ltd. since the stainless steel has lower outgas and is easily-worked. The hub 28 may more preferably be made of the stainless steel (DHS2) provided by Daido Steel Co., Ltd. since the stainless steel has high corrosion resistance.

The shaft 26 is fixed in the hole 28c arranged at the center of the hub 28 by using both press-fitting and glue, the hole 28c being arranged coaxially with the rotational axis R of the rotor 6.

The thrust ring 30 is in ring-shape and has a reverse L-shaped cross section. The thrust ring 30 is glued on an inner surface 28e of a hanging portion 28d of the hub 28. The thrust ring 30 may be made of steel such as SUS303 or SUS430F. The thrust ring 30 is formed by, for example, the press working or cutting of a steel plate. For example, the thrust ring 30 may preferably be made of the stainless steel (DHS1) provided by Daido Steel Co., Ltd. since the stainless steel has lower outgas and is easily-worked. The thrust ring 30 may more preferably be made of the stainless steel (DHS2) provided by Daido Steel Co., Ltd. since the stainless steel has high corrosion resistance.

In the case where the thrust ring 30 is made of steel that is softer than the hub 28 (in particular, the hanging portion 28d), it is more likely that the thrust ring 30 is deformed as it is attached to the inner surface 28e of the hanging portion 28d. If the thrust ring 30 is deformed, the gap between the thrust ring 30 and its surroundings may become narrower than the one that is required. Therefore, the thrust ring 30 is made of steel the hardness of which substantially is equal to that of the hub 28. This may suppress the deformation of the thrust ring 30.

The cylindrical magnet 32 is glued on a cylindrical inner surface 28f that is an inner cylindrical surface of the cup-like hub 28. The cylindrical magnet 32 is made of a rare-earth material such as Neodymium, Iron, or Boron. The cylindrical magnet 32 faces radially towards twelve teeth of the laminated core 40. The cylindrical magnet 32 is magnetized for driving, with sixteen poles along the circumferential direction. The surface of the cylindrical magnet 32 is treated for preventing rusting by electro deposition coating or spray coating.

The disk drive device 100 further comprises a bearing unit 12, a laminated core 40, coils 42, and a suction plate 86. The base 4 rotatably supports the hub 28 through the bearing unit 12. A ring-shaped wall 4e, the center of which is along the rotational axis R of the rotor 6, is formed on the upper surface 4d of the base 4. The ring-shaped wall 4e protrudes upwardly and surrounds the bearing unit 12. An inner surface of the ring-shaped wall 4e forms the bearing hole 4h in which the bearing unit 12 is inserted and glued. The base 4 includes an increasing-thickness portion 4n formed so that the less the distance between a part of the increasing-thickness portion 4n and the ring-shaped wall 4e is, the thicker the part of the increasing-thickness portion 4n becomes. The upper side of the cross section of the increasing-thickness portion 4n is formed to be a downwardly-convex smooth function or a straight line.

The bearing unit 12 includes the housing 44 and the sleeve 46 and rotatably supports the rotor 6 with respect to the base 4.

The housing 44 is glued in the bearing hole 4h of the base 4. The housing 44 is formed to be cup-shaped by integrating a cylindrical portion and a bottom portion as a single unit. The housing 44 is glued to the base 4 with the bottom portion downside.

The cylindrical sleeve 46 is glued on the inner side surface of the housing 44. A jetty portion 46a, which radially juts out, is formed at the upper end of the sleeve 46. This jetty portion 46a, in cooperation with the thrust ring 30, limits the motion of the rotor 6 in the direction along the rotational axis R (hereinafter referred to as "axial direction").

By making the housing 44 cup-shaped, a housing 44 with a higher strength can be realized compared with the case where the cylindrical portion and the bottom portion are formed separately and coupled afterwards. In addition, the assembling can be made easier. In the case where the cylindrical portion and the bottom portion are formed separately and coupled afterwards, it would be difficult to decrease the axial dimension of the housing since it is necessary to provide a region for gluing in order to obtain predetermined glue strength. Therefore, by making the housing 44 cup-shape, it would be possible to further thin the housing 44.

The sleeve 46 accommodates the shaft 26. The lubricant 48 is injected into a lubricant fill space 88 in between part of the rotor (the shaft 26, the hub 28, and the thrust ring 30) and the bearing unit 12. The lubricant fill space 88 includes: two groove portions 90a, 90b corresponding to a pair of herringbone-shaped radial dynamic pressure grooves 50 which are vertically separated from each other, the pair of grooves 50 are formed on the inner surface of the sleeve 46; and a non-groove portion 92 corresponding to the region between the two groove portions 90a, 90b where there is no dynamic pressure groove.

The bearing unit 12 is formed so that each of the lengths, in the axial direction, of the two groove portions 90a, 90b is greater than that of the non-groove portion 92. In this case, the decrease of the radial dynamic pressure in thinning the disk drive device 100 may be suppressed.

The groove portion 90a is the rotor-side one (upper one) of the two groove portions 90a, 90b. The bearing unit 12 is formed so that the length, in the axial direction, of the groove portion 90a is greater than that of the other groove portion 90b. In this case, by making the length, in the axial direction, of the groove portion 90a relatively greater, the bearing stiffness there could relatively be increased. The groove portion 90a is closer to the rotor 6 and owes a larger radial load than that of the other groove portion 90b. The disk drive device 100 according to the embodiment is suitable for this kind of situation and can cope with the radial load more efficiently.

A first herringbone-shaped or spiral-shaped thrust dynamic pressure groove (not shown) is formed on the lower surface of the thrust ring 30 that faces the upper surface of the housing 44. A second herringbone-shaped or spiral-shaped thrust dynamic pressure groove (not shown) is formed on the upper surface of the thrust ring 30 that faces the lower surface of the jetty portion 46a. The rotor 6 is axially and radially supported by the dynamic pressure generated in the lubricant 48 by radial dynamic pressure grooves and thrust dynamic pressure grooves when the rotor 6 rotates.

The pair of herringbone-shaped radial dynamic pressure grooves may be formed on the shaft 26. The first thrust dynamic pressure groove can be formed on the upper surface of the housing 44, and the second thrust dynamic pressure groove may be formed on the lower surface of the jetty portion 46a. Alternatively, the thrust dynamic pressure grooves may be formed on a lower surface of the hub 28 that faces the jetty portion 46a or the upper surface of the jetty portion 46a.

A capillary seal TS, where the gap between the inner surface 30c of the thrust ring 30 and the outer surface 44a of housing 44 gradually increases downward, is formed on the upside of the housing 44. The liquid level, which is a boundary between the clean gas filled in the clean space 24 and the lubricant 48, is located in the middle of the capillary seal TS. The capillary seal TS forms an entrance to the lubricant fill space 88. The capillary seal TS prevents the leakage of the lubricant 48 by way of the capillary effect. The inner surface 30c of the thrust ring 30 is formed so that the radius of the inner surface 30c decreases axially downward. In this case, the centrifugal force associated with the rotation of the rotor 6 applies the lubricant 48 a force directed towards the inside of the lubricant 48.

The laminated core 40 has a ring portion and twelve teeth, which extend radially outwardly from the ring portion, and is fixed on the upper surface 4d side of the base 4. The laminated core 40 is formed by laminating six thin magnetic steel sheets and mechanically integrating them. An insulation coating is applied onto the surface of the laminated core 40 by electrodeposition coating or powder coating. Each of the coils 42 is wound around one of the twelve teeth, respectively. A driving flux is generated along the teeth by applying a three-phase sinusoidal driving current through the coils 42.

The increasing-thickness portion 4n is thick on the coil 42 side. Therefore, if no countermeasure is provided and an impact is applied to the disk drive device, the increasing-thickness portion 4n may touch the coil 42 and the insulation between them may not be maintained. To cope with this, the coil 42 is formed so that the distance between the coil 42 and the increasing-thickness portion 4n is greater than a predetermined distance such as 0.1 mm. That is, the minimum distance between the increasing-thickness portion 4n and the coil 42 is equal to or greater than 0.1 mm. This may decrease the probability that the increasing-thickness portion 4n touch the coil 42 when an impact is applied to the disk drive device 100.

In particular, the coil 42 has a decreasing-thickness portion 42a the thickness of which decreases in accordance with the profile of the increasing-thickness portion 4n. The decreasing-thickness portion 42a is formed so that the less the distance between a part of the decreasing-thickness portion 42a and the rotational axis R is, the thinner the part of the decreasing-thickness portion 42a is. For example, the decreasing-thickness portion 42a is formed by winding the coil 42 with the number of turns decreasing towards the rotational axis R. Alternatively, the decreasing-thickness portion 42a is formed by pressing, in a direction in which the thickness of the coil 42 is measured, and thinning a part of the coil 42 that is close to the rotational axis R.

The laminated core 40, through the central hole 40a of the ring portion of the laminated core 40, is fitted to the outer surface 4g of the ring-shaped wall 4e with a press-fit or clearance fit and glued thereon. One example of how the laminated core 40 is fitted is that the laminated core 40 is fixed at the position where the laminated core 40 surrounds a portion of the side surface of the bearing hole 4h, the portion contacting the outer surface 44a of the housing 44. In this case, by going through the process in which the bearing unit 12 is mounted on the base 4 after the laminated core 40 is mounted on the base 4, the ring-shaped wall 4e of the base 4 is radially fixed by the laminated core 40 when the bearing unit 12 is mounted. Therefore, the deformation of the ring-shaped wall 4e associated with the insertion of the bearing unit 12 into the bearing hole 4h can be suppressed. As a result, the squareness of the bearing unit 12 after insertion can be improved. In many cases, the base 4 is made of aluminum, which is relatively soft metal. The present embodiment may preferably used for the cases where the base 4 is made of aluminum in particular.

The glued connection between the housing 44 and the base 4 is further described below. A ring-shaped first groove 4j, the center of which is along the rotational axis R of the rotor 6, is arranged on a side surface of the bearing hole 4h of the base 4. The first groove 4j has a semicircular cross section. A ring-shaped second groove 44b, the center of which is along the rotational axis R, is arranged on an outer surface 44a of the housing 44, the outer surface 44a contacting the side surface of the bearing hole 4h. The position of the second groove 44b in the axial direction is different from the position of the first groove 4j in the axial direction. The second groove 44b has a semicircular cross section.

Each of the first groove 4j and the second groove 44b may have a polygonal cross section or semielliptical cross section or rounded cross section.

The first groove 4j and the second groove 44b hold glue therein.

The conductive resin 52 is applied on the edge portion 41 of the bearing hole 4h on the lower surface 4k of the base 4. This conductive resin 52 electrically connects the base 4 and the housing 44. A cut portion 4m is arranged on the lower surface 4k of the base 4 by cutting along the edge portion 41 of the bearing hole 4h. The width of the cut portion 4m in the radial direction is greater than the depth of the cut of the cut portion 4m. The conductive resin 52 is applied so that it starts from the cut portion 4m and reaches the bottom surface 44c of the housing 44. In particular, the conductive resin 52 is applied in the cut portion 4m so that the height (the thickness in the axial direction) of the conductive resin 52 is less than the depth of the cut of the cut portion 4m.

Various materials can be adopted as the conductive resin 52. For example, a so-called, two-component epoxy in which polyoxypropylene diamine, as a hardener, is applied to a base resin, which is a mixture of an epoxy resin and silver powder, is easy to apply, is strong, has flexibility, and has good impact resistance. The two-component epoxy is also preferable in that there is a less volatile portion.

Various types of glue can be adopted as the glue to glue the housing 44 and the base 4. An anaerobic glue containing an acrylic acid ester as a main ingredient is preferable in that it is easy to work with. This anaerobic glue does not cure while it is exposed to air. Once the anaerobic glue enters in a fitted portion between the housing 44 and the base 4, the anaerobic glue rapidly reacts, polymerizes, and cures. By this, one can obtain a first stage of strength within a short period of time. In addition, since there is less contraction, the anaerobic glue is preferably used as a sealant to prevent leaks at the fitted portion. Furthermore, in the case where ultraviolet curability is given to the anaerobic glue, it is preferable in that spilled-out glue can be cured within a short period of time by irradiating ultraviolet light, thereby the work piece can be made rapidly available to handle.

It is possible that the glue or the conductive resin 52 gradually emits a volatile portion. This volatile portion may contaminate the clean space 24 and may prevent normal data read/write operation. To cope with this, the disk drive device 100 in assembly may be put in a high-temperature container for a long period of time, after assuring the electrical connection between the base 4 and the housing 44 by gluing the base 4 and the bearing unit 12 using the glue and applying the conductive resin 52, and before mounting the magnetic recording disk 8 onto the rotor 6. This can accelerate the removal of the volatile portion of the glue or the conductive resin 52. For example, by putting the disk drive device 100 in the high-temperature container for more than one hour while keeping the temperature of the high-temperature container higher than 65 degrees Celsius, most of the volatile portion of the glue or the conductive resin 52 can be removed. By putting the disk drive device 100 in the high-temperature container for more than one hour while keeping the temperature of the high-temperature container higher than 75 degrees Celsius, a sufficient amount of the volatile portion of the glue 54 or the conductive resin 52 can be removed. By keeping the temperature of the high-temperature container lower than 100 degrees Celsius, it is possible to prevent the glue or the conductive resin 52 from denaturing or being weakened due to heat.

Figure 3:
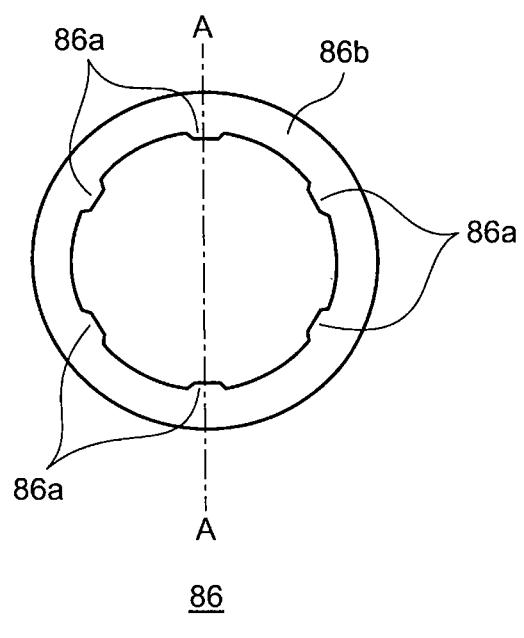
FIG. 3 shows a top view of a suction plate of FIG. 2.

FIG. 3 shows a top view of the suction plate 86. The A-A line in FIG. 3 corresponds to the cross section of FIG. 2. The suction plate 86 faces the cylindrical magnet 32 in the axial direction. The suction plate 86 is made of a magnetic material. The suction plate 86 has a ring portion 86b and six projecting portions 86a that radially inwardly extend from the ring portion 86b. The suction plate 86 is fixed to the base 4 by six projecting portions 86a being fixed to the base 4 by, for example, swaging. The suction plate 86 is attracted by the cylindrical magnet 32 since the suction plate 86 is made of the magnetic material. This applies to the cylindrical magnet 32 a force downward in the axial direction, thereby levitation of the rotor 6 while rotation of the rotor 6 is suppressed.

Figure 4:
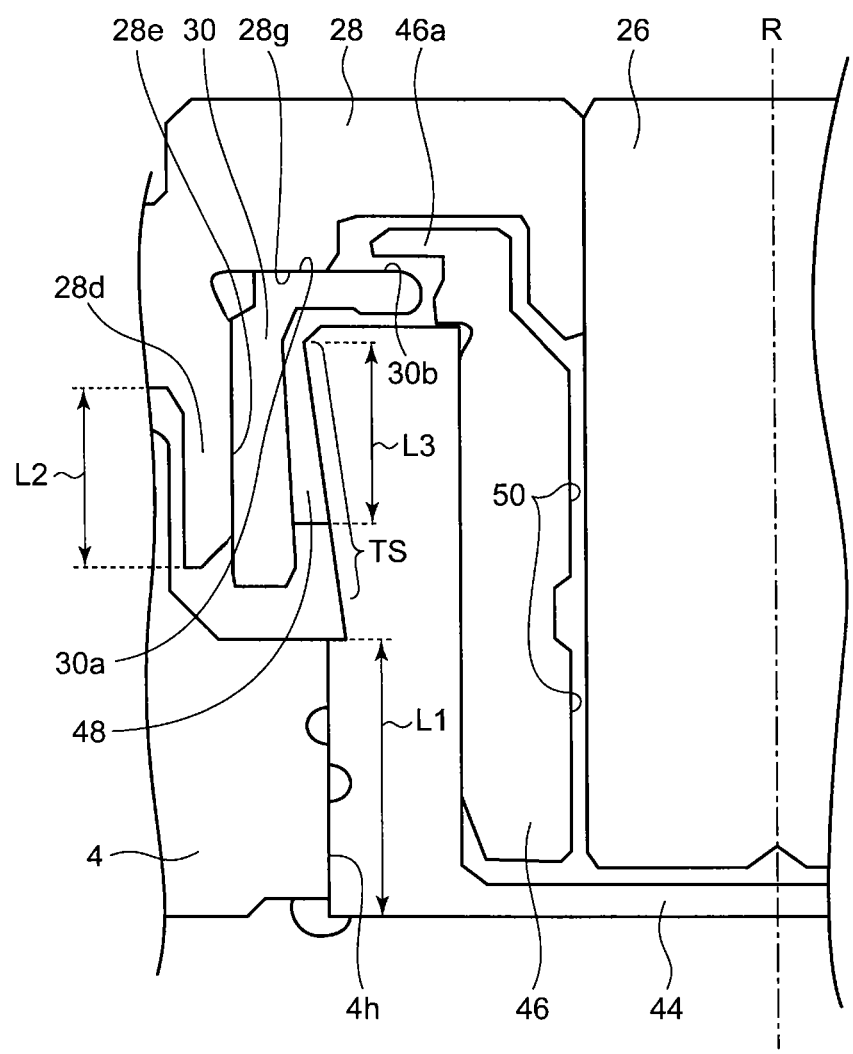
FIG. 4 shows a magnified cross section around the thrust ring of the disk drive device of FIG. 2.

FIG. 4 shows a magnified cross section around the thrust ring 30 of the disk drive device 100 of FIG. 2. The thrust ring 30 has a hub-facing surface that faces the hub 28 in the axial direction. The hub-facing surface has an outer periphery region 30a and an inner periphery region 30b. The outer periphery region 30a touches a lower surface 28g of the hub 28. The inner periphery region 30b has the second thrust dynamic pressure grooves. The inner periphery region 30b rotates under the jetty portion 46a.

In the case where the outer periphery region 30a and the inner periphery region 30b are formed with different heights in the axial direction, it would be difficult to improve the precision of the height of the inner periphery region 30b in the axial direction. This is because a manufacturing error of the lower surface 28g of the hub 28 and a manufacturing error of the inner periphery region 30b and the outer periphery region 30a adds together. If the precision of the height of the inner periphery region 30b in the axial direction is low, a precision of the gap between the inner periphery region 30b and the jetty portion 46a would be low. If this precision of the gap is low, it would be necessary to make this gap larger in order to prevent the two from touching, and the thinning of the disk drive device may become difficult accordingly.

To cope with this, the outer periphery region 30a and the inner periphery region 30b of the thrust ring 30 may be formed such that the two are tangential to a planar surface that is perpendicular to the rotational axis R. That is, the thrust ring 30 may be formed so that the hub-facing surface substantially is planar. In this case, the outer periphery region 30a and the inner periphery region 30b are coplanar in the axial direction, and the inner periphery region 30b is located at the same position in the axial direction with the lower surface 28g of the hub 28. As a result, the precision of the height in the axial direction of the inner periphery region 30b can be kept high.

The length L3, in the axial direction, of the lubricant 48 existing in the capillary seal TS relates to the length L1, in the axial direction, of the bearing hole 4h such that making one of the two longer results in making the other shorter. In the case where the dimension (thickness), in the axial direction, of the disk drive device 100 should be constant, making the length L2, in the axial direction, of the hanging portion 28d longer results in making the length L1, in the axial direction, of the bearing hole 4h shorter.

It may be possible to make the length L3, in the axial direction, of the lubricant 48 longer than the length L1, in the axial direction, of the bearing hole 4h. Alternatively, it may be possible to make the length L2, in the axial direction, of the hanging portion 28d longer than the length L1, in the axial direction, of the bearing hole 4h. However, a short length L1, in the axial direction, of the bearing hole 4h may promote the peel-off of the glued portion between the bearing unit 12 and the base 4 when an impact is applied to the disk drive device 100. If the peel-off of the glued portion happens, a disk drive device having an arrangement with narrow gaps may experience a problem such as touching. To cope with this, the disk drive device 100 may be arranged so that the length L1, in the axial direction, of the bearing hole 4h is longer than the length L3, in the axial direction, of the lubricant 48 existing in the capillary seal TS. Also, the disk drive device 100 may be arranged so that the length L1, in the axial direction, of the bearing hole 4h is longer than the length L2, in the axial direction, of the hanging portion 28d. In these cases, the impact resistance of the glued portion between the bearing unit 12 and the base 4 can be improved.

Figure 5:
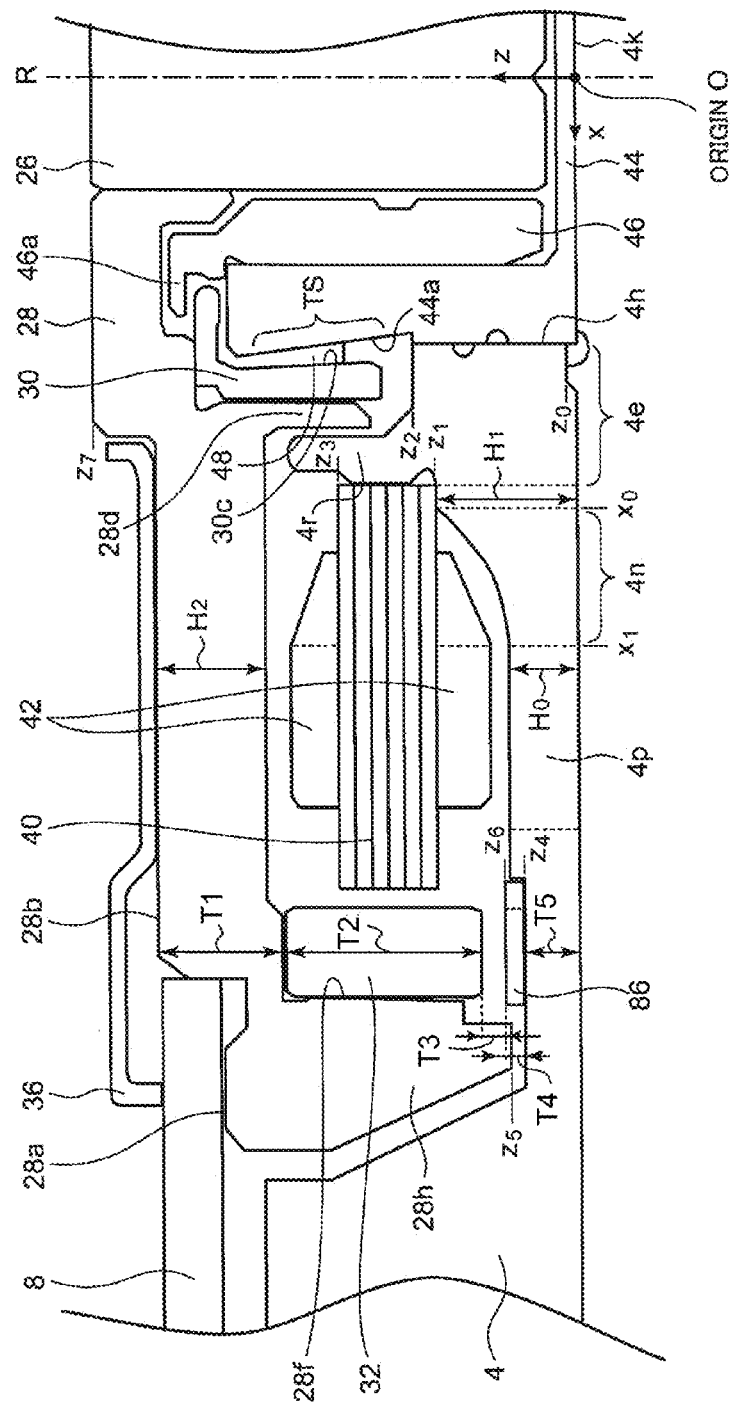
FIG. 5 shows a magnified cross section of the left half of FIG. 2.

FIG. 5 shows a magnified cross section of the left half of FIG. 2. In FIG. 5, the rotational axis R is defined to be a z axis. It is assumed that the z coordinate of the lower surface 4k of the base 4 is z=0.

The portion where the housing 44 touches the ring-shaped wall 4e occupies a range of $z_0 < z < z_2$ in the z coordinate. The laminated core 40 occupies a range of $<z_1 < z < z_3$ in the z coordinate. Here, the disk drive device 100 is arranged so that $z_0 < z_1 < z_2 < z_3$ holds, in other words the range of the z coordinate of the portion where the housing 44 touches the ring-shaped wall 4e at least partly overlaps the range of the z coordinate of the laminated core 40. In this case, it is possible to obtain a large portion where the housing 44 touches the ring-shaped wall 4e, thereby the impact resistance of the glued portion between the bearing unit 12 and the base 4 can be improved.

The suction plate 86 occupies a range of $z4 < z < z6$ in the z coordinate. The hub 28 occupies a range of $z5 < z < z7$ in the z coordinate. Here, the disk drive device 100 is arranged so that $z4 < z5 < z6 < z7$ holds, in other words the range of the z coordinate of the suction plate 86 at least partly overlaps the range of the z coordinate of the hub 28. Accordingly, a labyrinth structure is arranged by the suction plate 86 and the magnet mount portion 28h of the hub 28, the labyrinth structure being arranged between an inner space of the hub 28 and the outer space of the hub 28. In this case, even if unintended extraneous substance such as droplets of lubricant 48 exists in the inner space of the hub 28, the spread-out of such extraneous substance to the outside of the hub 28 may be suppressed due to the labyrinth structure.

The inner surface of the ring-shaped wall 4e forms part of the side surface of the bearing hole 4h. A ring convex portion 4r is provided on the ring-shaped wall 4e, the ring convex portion 4r further protruding towards the hub 28 side. An outer surface of the ring convex portion 4r is fit to the ring portion of the laminated core 40. The hanging portion 28d and the thrust ring 30 rotate in the region defined partly by the ring convex portion 4r on the rotational axis R side.

The increasing-thickness portion 4n is arranged radially outwardly of the ring convex portion 4r and is formed so that the thickness increases towards the ring convex portion 4r. The coil-facing portion 4p is arranged to be adjacent to the increasing-thickness portion 4n, which is located outside of the increasing-thickness portion 4n in a radial manner. The coil-facing portion 4p is arranged so that the thickness $H_0$ substantially is constant. The thickness $H_0$ is less than the half of the length L1, in the axial direction, of the bearing hole 4h. A surface of the increasing-thickness portion 4n on the hub 28 side smoothly connects to a surface of the coil-facing portion 4p on the hub 28 side.

It is possible to make the thickness $H_0$ of the coil-facing portion 4p less than 0.7 mm. This is preferred since the disk drive device 100 can be thinned. As the thickness $H_0$ of the coil-facing portion 4p is decreased, the possibility that a pinhole is created in the aluminum die-casting process or in the cutting process may increase. Therefore, the thickness $H_0$ of the coil-facing portion 4p may be made larger than or equal to 0.4 mm. This is preferred since the creation of the pinhole may be suppressed.

In FIG. 5, an x axis is defined along a straight line that is perpendicular to the rotational axis R and that intersects with the rotational axis R. The x coordinate of the rotational axis R is defined to be x=0.

The increasing-thickness portion 4n is formed so that the following equation is satisfied:

$$\frac{H(x)}{H_0} = 1.25\left(\frac{x}{x_0}\right)^{-1.2} \quad \text{(equation 1)}$$

where x denotes an x coordinate of a certain position in the increasing-thickness portion 4n, $x_0$ is the x coordinate of the position in the increasing-thickness portion 4n that is the closest to the rotational axis R, and H(x) is a thickness at the position x of the increasing-thickness portion 4n. All of x, $x_0$, H(x), $H_0$ are in the same unit such as mm.

For example, $H_0$=0.7 mm, $x_0$=4.8 mm, $H_1$=H($x_0$)=0.88 mm, (the x coordinate $x_1$ of the outer most position, in the radial direction, of the increasing-thickness portion 4n)=5.8 mm.

A portion of the hub 28 that faces the coil 42 in the axial direction and a coil facing portion 4p of the base 4 that faces the coil 42 in the axial direction are considered below. In order to thin the disk drive device 100, it would be one option to thin the portion of the hub 28 that faces the coil 42 in the axial direction. However, the inventors have realized that, in this case, the magnetic recording disk 8 is more susceptible to a vibration when the magnetic recording disk 8 is mounted and rotated with high speed compared with the case where the coil-facing portion 4p is thinned. Therefore, in the disk drive device 100, the portion of the hub 28 that faces the coil 42 in the axial direction is thicker than the coil-facing portion 4p. In other words, (the thickness $H_2$ of the portion of the hub 28 that faces the coil 42 in the axial direction)>$H_0$.

The operation of the disk drive device 100 as described above shall be described below. The three-phase driving current is supplied to the coils 42 to rotate the magnetic recording disk 8. The driving fluxes are generated along the twelve teeth by making the driving current flow through the coils 42. These driving fluxes give torque to the cylindrical magnet 32, and the rotor 6 and the magnetic recording disk 8, which is fitted to the rotor 6, rotate. Along with this, the voice coil motor 16 swings the swing arm 14, and the read/write head goes back and forth within the swing range on the magnetic recording disk 8. The read/write head converts magnetic data recorded on the magnetic recording disk 8 to an electrical signal and transmits the electrical signal to a control board (not shown). The read/write head also converts data sent from the control board in a form of an electrical signal to magnetic data and writes the magnetic data on the magnetic recording disk 8.

When the disk drive device 100 is thinned, it may be one option to make the base 4 thin rather than the hub 28 in light of the vibration during rotation as described above. One of the points to be kept in mind when thinning the base 4 is impact resistance. When acceleration due to an impact is applied to the disk drive device 100, a stress is applied near the center of the base 4. The strength of the stress corresponds to the value given by multiplying the acceleration due to the impact by sum of the masses of the magnetic recording disk 8, the hub 28, the bearing unit 12, the laminated core 40, and the coils 42. In particular, this stress tends to concentrate at the boundary between the ring-shaped wall 4e and the increasing-thickness portion 4n.

In the case where no increasing-thickness portion 4n is provided and a coil-facing portion of constant thickness is provided from the ring-shaped wall 4e and is arranged to adjoin the ring-shaped wall 4e, a stress due to an impact basically is distributed in the coil-facing portion so that the stress is inversely proportional to the distance from the rotational axis R. Therefore, the stress is concentrated at the boundary between the ring-shaped wall 4e and the coil-facing portion, in particular at the corner portion, and a plastic deformation or a crack may be created therefrom.

In the disk drive device 100 according to the present embodiment, the increasing-thickness portion 4n is formed so that the less the distance between a part of the increasing-thickness portion 4n and the ring-shaped wall 4e is, the thicker the part of the increasing-thickness portion 4n is. Therefore, the stress at the boundary between the ring-shaped wall 4e and the increasing-thickness portion 4n spreads and the boundary can bear a larger stress in total. In other words, it is possible to have the stress distributed substantially evenly, independently of the distance from the rotational axis R. As a result, the disk drive device 100 can bear a larger impact.

Alternatively, it is possible to thin the base 4 in response to the improvement of the impact resistance caused by the increasing-thickness portion 4n. Therefore, it may be possible to make the disk drive device 100 thinner.

The inventors of the present invention repeated simulations of stress distribution by changing the shape of the increasing-thickness portion 4n. According to these simulations, the inventors have found that, in the case where the thickness $H_0$ of the coil-facing portion 4p is in the range from 0.5 mm to 1.2 mm and the x coordinate $x_0$ of the position in the increasing-thickness portion 4n that is the closest to the rotational axis R is in the range from 4 mm to 15 mm and the increasing-thickness portion 4n is formed so that the following equation is satisfied, the stress spreads out in a suitable manner and the stress does not exceed, in simulations, the elastic limit of the material of the base and the deformation of the base is kept within a range allowable for real usage.

$$\frac{H(x)}{H_0} \geq k\left(\frac{x}{x_0}\right)^{-1.2} \quad \text{(equation 2)}$$

k is a constant determined by mechanical strength of the material of the base. k may be determined by experiments.

In this simulation, the base is chosen to be an aluminum die-cast (ADC12 in JIS). In this case, the tensile strength is about 300 MPa. However, according to the experiences the inventors as skilled artisan have, it is likely that a stress of about 150 MPa may already create a deformation of about 0.2 percent. Therefore, preferably the stress is suppressed below about 120 MPa. In the case where the base is made by aluminum die-casting, the base may have a so-called blow hole that is a low-density region. If the stress in the region where the blow hole exists exceeds 150 MPa, the base may be largely deformed. Therefore, it is more preferable that the stress is suppressed below about 100 MPa. Using these criteria, the inventors have found that, in the case where an upward acceleration due to an impact of 11760 m/s² (1200 G) is applied to the disk drive device and the base is made of Aluminum, the threshold value was give by k=1.25. That is, the disk drive device that satisfies the equation 2 above for k=1.25 can maintain the predetermined height of the hub when the disk drive device receives a test impact load of 1200 G.

Figure 6A:
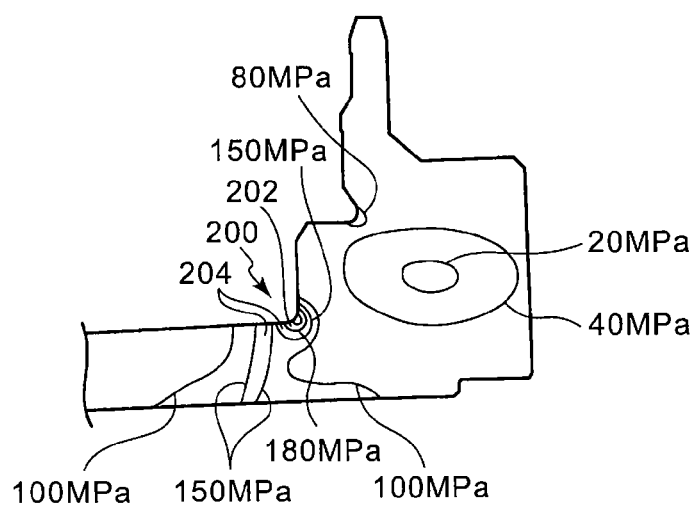
FIG. 6A shows stress distributions obtained by simulations, using contour lines.
Figure 6B:
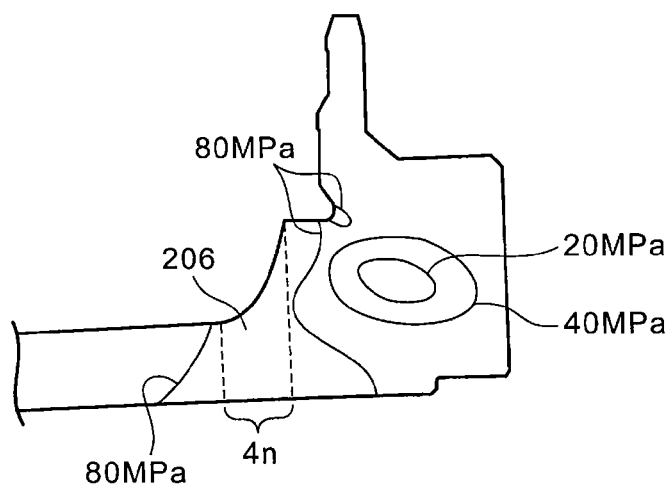
FIG. 6B shows stress distributions obtained by simulations, using contour lines.
Figure 6C:
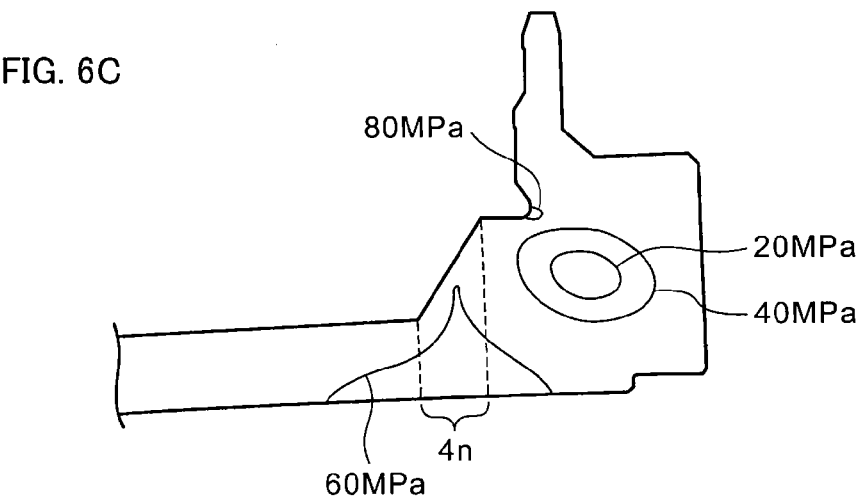
FIG. 6C shows stress distributions obtained by simulations, using contour lines.

FIGS. 6A, 6B and 6C show stress distributions obtained by simulations, using contour lines. The simulations used here are computer simulations in which finite element method is used. FIG. 6A shows the results of the simulations in which the base does not have the increasing-thickness portion 4n. As shown in FIG. 6A, in the case where the base does not have the increasing-thickness portion 4n, the contour lines are dense at the corner 200 of the base and the stress is concentrated there. In particular, there is a region 202 near the corner 200 where the stress exceeds 180 MPa. Around there, there are wide regions 204 where the stress exceeds 150 MPa. If a blow hole exists in the regions 204 where the stress exceeds 150 MPa, the base may be largely deformed.

FIG. 6B shows the results of the simulations in which the increasing-thickness portion 4n is formed so that the following equation is satisfied.

$$\frac{H(x)}{0.7} = 1.25\left(\frac{x}{4.8}\right)^{-1.2} \quad \text{(equation 3)}$$

In FIG. 6B, even the region 206 where the stress is the highest has the stress of about 100 MPa. Therefore, it can be said that the stress is suitably spread out in this shape of the increasing-thickness portion 4n.

FIG. 6C shows the results of the simulations in which the increasing-thickness portion 4n is formed so that the following equation is satisfied.

$$H(x)=5.92-0.9x \quad \text{(equation 4)}$$

In FIG. 6C, the increasing-thickness portion 4n is thicker than that shown in FIG. 6B. Therefore, the stress is further spread out and the maximum stress is about 80 MPa. Therefore, even if the blow hole exists, the deformation there can be suppressed.

In the design of a disk drive device, it is desired that a sufficient torque is obtained even if the disk drive device is thinned. In order to suppress the decrease of the torque by thinning, the usual way is to make the cylindrical magnet 32 relatively thick. In order to make the cylindrical magnet 32 relatively thick, it would be one option to thin a suction plate accordingly. However, in the case where the suction plate is fixed to the base 4 by evenly applying load to the whole inner periphery of the suction plate, thinning of the suction plate may make it more probable that even a slight unevenness of the swage load applied to the inner periphery causes a large deformation of the suction plate. If the suction plate is deformed, it may be difficult to keep the gap between the suction plate and the cylindrical magnet 32 uniform along the circumferential direction. If this gap becomes non-uniform, the attracting force between the suction plate and the cylindrical magnet 32 changes in the circumferential direction. This may make the rotation of the rotor 6 unstable. In the worst case, the suction plate may touch the cylindrical magnet 32. According to the experiences the inventors as skilled artisan have, in order to avoid this situation in the case where the suction plate is fixed to the base 4 by evenly applying load to the whole inner periphery of the suction plate, it is not advised in general to make the thickness of the suction plate less than or equal to 0.5 mm.

To cope with this, in the disk drive device according to this embodiment, the suction plate 86 has a ring portion 86b and six projecting portions 86a that radially inwardly extend from the ring portion 86b. The suction plate 86 is fixed to the base 4 by six projecting portions 86a being fixed to the base 4 by, for example, swaging. Here, load is applied to each of the six projecting portions 86a. Therefore, the suction plate 86 is less susceptible to deformation than the case where a suction plate is fixed to the base 4 by evenly applying load to the whole inner periphery of the suction plate. In addition, the suction plate 86 can be further thinned and the cylindrical magnet 32 can be made thicker accordingly, thereby increasing torque. In particular, in the disk drive device 100 according to the present embodiment, it is possible to make the thickness of the suction plate 86 less than or equal to 0.5 mm, or preferably less than or equal to 0.4 mm.

If the suction plate 86 is thinned too much, the suction plate tends to be magnetically saturated and it may be difficult to maintain a predetermined strength of an attraction force. To cope with this, the thickness of the suction plate 86 may be made greater than or equal to 0.1 mm. This is advantageous because the predetermined strength of the attraction force can be maintained. The suction plate 86 with the thickness in the range from 0.2 mm to 0.3 mm is preferred since the deformation can be suppressed as well as a stable attraction force is realized.

In the present embodiment, referring to FIG. 5, the dimensions along the straight line that is parallel to the rotational axis R and that intersects the body of the suction plate 86 are as follows:

the thickness T1 of the hub 28=1.5 mm,
the thickness T2 of the cylindrical magnet 32=2.0 mm,
the width T3 of the gap between the cylindrical magnet 32 and the suction
plate 86=0.38 mm,
the thickness T4 of the suction plate 86=0.25 mm,
the thickness T5 of the base 4=0.7 mm, and
the thickness of the disk drive device 100=4.83 mm.

In the case where the thickness T4 of the suction plate 86 is designed to be 0.4 mm, the thickness T2 of the cylindrical magnet 32 is 1.85 mm.

If the number of the projecting portions 86a is small, the suction plate 86 may be fixed atilt. Therefore, the number of the projecting portions 86a may be made greater than or equal to 3. This may reduce the possibility of the suction plate 86 being fixed atilt. If the number of the projecting portions 86a is large, the unevenness of the load applied to the projecting portions 86a may cause deformation. Therefore, the number of the projecting portions 86a may be made less than or equal to 12. This may suppress the deformation.

In the disk drive device 100 according to the present embodiment, the first groove 4j and the second groove 44b both of which are filled with glue serve to keep glue therein. Therefore, the glue strength between the base 4 and the bearing unit 12 is improved. In addition, these grooves improve the airtightness.

(A Manufacturing Method)

A method for manufacturing the disk drive device 100 according to the embodiment will be described below. The shaft 26, the hub 28, the thrust ring 30, the bearing unit 12 and the lubricant 48 are hereinafter referred to as a fluid dynamic bearing.

In a bearing assembling step, the fluid dynamic bearing without the lubricant 48 is assembled.

In a preparation step, a fluid dynamic bearing without the lubricant 48 is placed in a work space that is able to be evacuated. The fluid dynamic bearing is oriented so that the entrance of the capillary seal TS faces up. Then the working pressure, which is a pressure in the work space, is lowered to, for example, below 100 Pa and the lubricant fill space 88 is depressurized.

In a injection step, a discharge nozzle for discharging the lubricant 48 is inserted into the inside of the entrance of the capillary seal TS. During this insertion, the discharge nozzle first moves to a horizontal position corresponding to the entrance and then moves, in a vertical direction, into the inside of the entrance. By doing so, when the fluid dynamic bearing without the lubricant 48 is set in the work space, the discharge nozzle is not an obstacle for the fluid dynamic bearing. As a result, it is possible to easily set the fluid dynamic bearing within a short period of time.

After inserting the discharge nozzle into the inside of the entrance of the capillary seal TS, the lubricant 48 is discharged from the discharge nozzle. The amount of the lubricant 48 that is discharged is set so that the lubricant 48 does not spill out of the capillary seal 48. For example, the amount of the lubricant 48 that is discharged is set so that the lubricant 48 fills up the capillary seal TS.

In a pull-in step, the pressure of the work space is restored to the pressure such as the atmospheric pressure which is higher than the pressure inside the lubricant fill space 88. The lubricant 48 is pulled in to the inside of the lubricant fill space 88 by a pressure difference between the inside and outside of the lubricant fill space 88. As a result, the lubricant 48 is filled in the lubricant fill space 88.

In this pull-in step, gas such as air may remain in the lubricant 48 that is filled in the fluid dynamic bearing. If much air remains in the fluid dynamic bearing, when the fluid dynamic bearing is put in a low-pressure and high-temperature environment, the remaining air may expand and the expanded air may push the lubricant 48 out of the bearing unit 12 and may induce release of the lubricant 48. If the lubricant 48 spreads out, the reliability of the disk drive device may be deteriorated. To cope with this, the present manufacturing method includes a remaining gas inspection step, in which, after the pull-in step, a fluid dynamic bearing is detected and removed as a defective unit if the amount of air remaining in the lubricant 48 filled in the fluid dynamic bearing is more than a predetermined amount. In this case, with regard to a disk drive device manufactured by going through such an inspection step, it is less likely that the lubricant 48 spills out due to the remaining air.

The remaining gas inspection step includes a first measuring step and a second measuring step and a removal step.

Figure 7A:
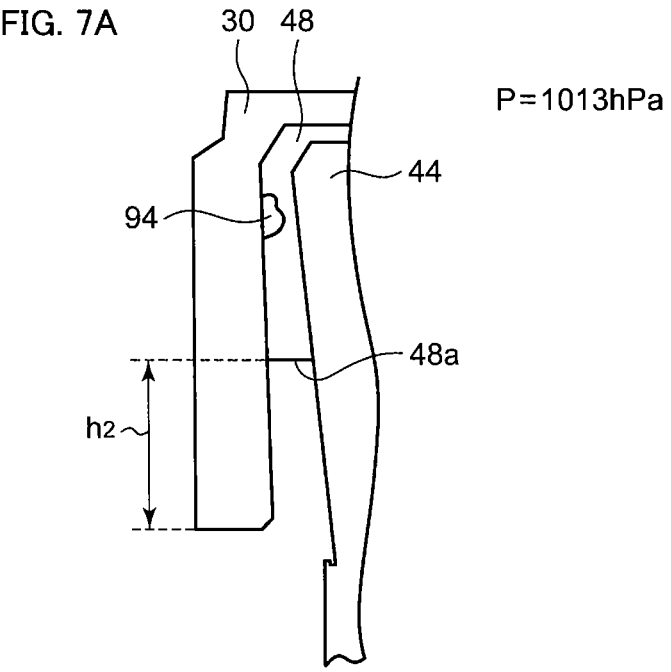
FIG. 7A explains the measuring steps.
Figure 7B:
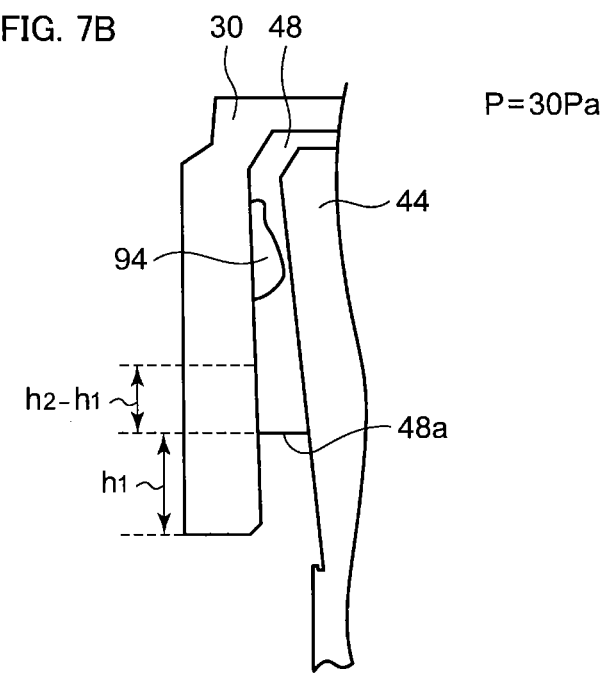
FIG. 7B explains the measuring steps.

FIGS. 7A and 7B explain the measuring steps. FIG. 7A explains the first measuring step. In the first measuring step, with regard to the fluid dynamic bearing with the introduced lubricant 48, a second height $h_2$ of the liquid level 48a of the lubricant 48 in the direction along the rotational axis R under a second pressure such as 1013 hPa (1 atmosphere) is measured with reference to the lower surface of the thrust ring 30. FIG. 7A shows the situation where a remaining air 94 exists in the upper part of the capillary seal TS.

FIG. 7B explains the second measuring step. In the second measuring step, with regard to the fluid dynamic bearing with the introduced lubricant 48, a first height h1 of the liquid level 48a of the lubricant 48 in the direction along the rotational axis R under a first pressure such as 30 Pa which is lower than the second pressure is measured with reference to the lower surface of the thrust ring 30. The first pressure is lower than 100 Pa and preferably is in the range from 30 Pa to 50 Pa. Since the first pressure is lower than the second pressure, the remaining air 94 expands more than the case shown in FIG. 7A. The liquid level 48a of the lubricant 48 moves downward accordingly and the first height h1 decreases.

In the removal step, a fluid dynamic bearing with the introduced lubricant 48 is inspected based on the measured first height $h_1$ and the measured second height $h_2$. In particular, if the absolute value of the difference between the first height $h_1$ and the second height $h_2$ is greater than a predetermined reference value, then the fluid dynamic bearing is treated as the one that does not satisfy the criteria. If a fluid dynamic bearing is judged as not satisfying the criteria, then the fluid dynamic bearing is removed.

According to this remaining gas inspection step, an effect due to the remaining gas can be detected with high precision. For example, if the difference ($h_2-h_1$) between the first height h1 and the second height $h_2$ exceeds 50 μm, then the fluid dynamic bearing may be removed as a defective unit.

In a stator assembling step, after the remaining gas inspection step, the laminated core 40 with the coils 42 wound is fixed to the base 4. Then the bearing unit 12 of the fluid dynamic bearing is glued in the bearing hole 4h of the base 4.

In a high-temperature step, after the bearing unit 12 is glued, the assembly is put in a high-temperature container having clean atmosphere at 65 to 100 Celsius degrees, for 1 to 3 hours. In the case where the first seal member 84a and the second seal member 84b are hardening resin in liquid form, the hardening resin may be applied in any one of the steps before the high-temperature step. This is advantageous because the high-temperature step may accelerate the hardening. In the case where the first seal member 84a and the second seal member 84b are formed by fixing a sheet-like material, the fixation may be performed after the high-temperature step. This may prevent the seal member from deteriorating.

In a disk assembling step, the magnetic recording disk 8, the data read/write unit 10, etc. are mounted to the assembly. In the disk assembling step, the top cover 2 is fixed to the upper surface 4c of the outer circumference wall 4b of the base 4 using the screws 20. A clean gas is filled in the clean space 24 through an opening of the base 4. Afterwards, the opening is plugged using a predetermined plugging member. Afterwards, a predetermined performance test step is performed on the disk drive device 100 and the resultant is the manufactured disk drive device.

Above is an explanation based on the exemplary embodiments. These embodiments are intended to be illustrative only, and it will be obvious to those skilled in the art that various modifications to constituting elements and processes could be developed and that such modifications are also within the scope of the present invention.

The embodiment describes the case where the coil 42 has a decreasing-thickness portion 42a the thickness of which decreases in accordance with the profile of the increasing-thickness portion 4n. However, the present invention is not limited to this. For example, instead of providing the decreasing-thickness portion 42a to the coil 42, the increasing-thickness portion may be formed so that the distance between the coil and the increasing-thickness portion is greater than a predetermined distance such as 0.1 mm. This may also decrease the probability that the increasing-thickness portion touch the coil when an impact is applied to the disk drive device.

The embodiment describes the case where the suction plate 86 has a ring portion 86b and six projecting portions 86a that radially inwardly extend from the ring portion 86b. However, the present invention is not limited to this. For example, the suction plate may have a ring portion and a plurality of projecting portions that radially outwardly extend from the ring portion. In this case, the suction plate is fixed to the base 4 by the plurality of projecting portions being fixed to the base 4 by, for example, swaging.

The embodiment describes the case where the housing 44 is formed to be cup-shaped by integrating the cylindrical portion and the bottom portion as a single unit. However, the present invention is not limited to this. For example, the housing may be formed so that the diameter of the portion where the housing touches the ring-shaped wall is greater than the diameter of other portion.

Figure 8:
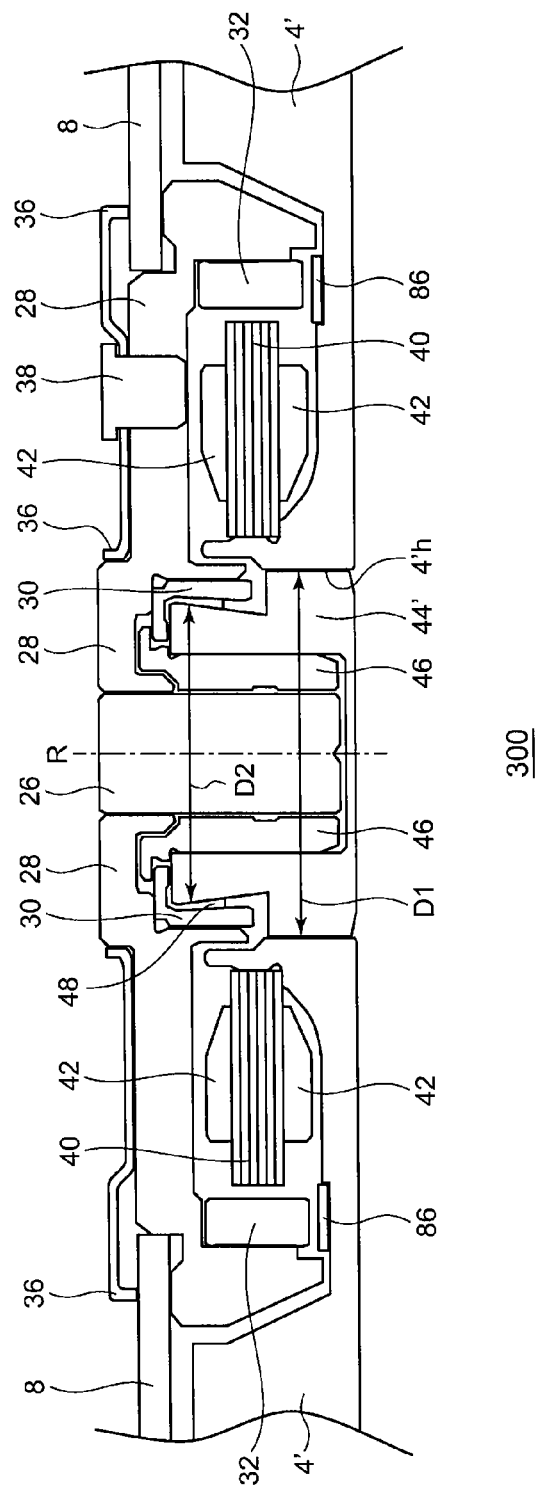
FIG. 8 shows a cross section of the disk drive device according to a modification.

FIG. 8 shows a cross section of the disk drive device 300 according to a modification. The housing 44' is formed so that, in the bearing unit, the diameter D1 of the portion where the housing 44' touches the bearing hole 4'h of the base 4' is greater than the diameter D2 of the other portion (for example, such as the diameter D2 of the upper part of the housing 44'). The base 4' is formed so that the diameter of the bearing hole 4'h is greater than the diameter of the thrust ring 30.

According to this modification, the area of glued portion between the housing 44' and the base 4' is greater than that of the embodiment. Therefore, the glue strength is strengthened.

The embodiment describes the so-called outer-rotor type of the disk drive device 100 in which the cylindrical magnet 32 is located outside the laminated core 40. However, the present invention is not limited to this. For example, the present invention may be applied to the so-called inner-rotor type of the disk drive device in which the cylindrical magnet is located inside the laminated core.

The embodiment describes the case where the bearing unit 12 is fixed to the base 4, and the shaft 26 rotates with respect to the bearing unit 12. However, the present invention is not limited to this. For example, the present invention may be applied to a shaft-fixed type of the disk drive device in which the shaft is fixed to the base, and the bearing unit and the hub rotate together with respect to the shaft.

The embodiment describes the case where the bearing unit 12 is directly mounted onto the base 4. However, the present invention is not limited to this. For example, a brushless motor comprising a rotor, a bearing unit, a laminated core, coils, and a base can separately be manufactured, and the manufactured brushless motor can be installed on a chassis.

The embodiment describes the case where the laminated core is used. However, the present invention is not limited to this. The core does not have to be a laminated core.

The embodiment describes the case where the housing 44 and the sleeve 46 are separate parts. However, the present invention is not limited to this. For example, the housing and the sleeve can be made as a single unit. In this case, the number of parts can be reduced, and it may become easier to assemble.

While the preferred embodiments of the present invention have been described using specific terms, such description is for illustrative purposes only, and it is to be understood that changes and variations may be made without departing from the spirit or scope of the appended claims.

What is claimed is:

1. A rotating device, comprising:
a hub on which a recording disk is to be mounted;
a base rotatably supporting the hub via a bearing unit, the base having a ring-shaped wall that surrounds the bearing unit and that protrudes towards the hub;
a core fixed to the base, the core having a ring portion and a plurality of teeth that radially extend from the ring portion; and
coils wound around the plurality of teeth,
wherein the base includes an increasing-thickness portion formed so that the less the distance between a part of the increasing-thickness portion and the ring-shaped wall is, the thicker the part of the increasing-thickness portion becomes and so that the following equation is satisfied:

$$\frac{H(x)}{H_0} \geq k\left(\frac{x}{x_0}\right)^{-1.2} \quad \text{(equation 1)}$$

where x is a distance between a part of the increasing-thickness portion and a rotational axis of the hub, $x_0$ is a predetermined reference distance, $H(x)$ is a thickness of the increasing-thickness portion at the distance x, $H_0$ is a predetermined reference thickness, and k is a predetermined constant greater than zero,
wherein the base includes a coil-facing portion provided radially-outside and adjacent to the increasing-thickness portion, the coil-facing portion facing the coil in an axial direction and having a predetermined constant thickness,
wherein the coils have a decreasing-thickness portion, the thickness of which decreases in accordance with a profile of the increasing-thickness portion, and
wherein a portion of the hub that faces the coils in the direction along the rotational axis of the hub is thicker than the coil-facing portion.

2. The rotating device according to claim 1, wherein the coils are formed so that a distance between the coils and the increasing-thickness portion is greater than a predetermined distance.

3. The rotating device according to claim 1, wherein the increasing-thickness portion is formed so that the hub maintains a predetermined height even if a test impact load of 1200 G is applied.

4. The rotating device according to claim 1, wherein, when a coordinate is defined along the rotational axis of the hub, the coordinate range of the core at least partly overlaps the coordinate range of a portion where the bearing unit touches the ring-shaped wall.

5. The rotating device according to claim 1, wherein a space on the hub-side of the base is filled with a gas, which includes a predetermined ratio of Helium, and
a through hole is provided on the base, and
a seal member is provided along an edge of the through-hole on a surface of the base opposite to the hub.

6. The rotating device according to claim 1, further comprising a ring-shaped thrust ring, the center of which is along the rotational axis of the huh, the ring-shaped thrust ring being fixed to the hub, and
the thrust ring has a substantially flat hub-facing surface that faces the hub in the direction along the rotational axis of the hub, and
a part of the hub-facing surface is in contact with the hub and the other part, when the hub rotates, suppresses the motion of the hub in the direction along the rotational axis of the hub in cooperation with the bearing unit.

7. The rotating device according to claim 6, wherein the thrust ring is made of a material, the hardness of which substantially is equal to that of the hub.

8. A rotating device, comprising:
a hub on which a recording disk is to be mounted;
a base rotatably supporting the hub via a bearing unit, the base having a ring-shaped wall that surrounds the bearing unit and that protrudes towards the hub;
a core fixed to the base, the core having a ring portion and a plurality of teeth that radially extend from the ring portion; and
coils wound around the plurality of teeth,
wherein the base includes an increasing-thickness portion formed so that the less the distance between a part of the increasing-thickness portion and the ring-shaped wall is, the thicker the part of the increasing-thickness portion becomes and so that the following equation is satisfied:

$$\frac{H(x)}{H_0} \geq k\left(\frac{x}{x_0}\right)^{-1.2} \qquad \text{(equation 1)}$$

where x is a distance between apart of the increasing-thickness portion and a rotational axis of the hub, $x_0$ is a predetermined reference distance, $H(x)$ is a thickness of the increasing-thickness portion at the distance x, $H_0$ is a predetermined reference thickness, and k is a predetermined constant greater than zero,
wherein the base includes a coil-facing portion provided radially-outside and adjacent to the increasing-thickness portion, the coil-facing portion facing the coil in an axial direction and having a predetermined constant thickness,
wherein the coils have a decreasing-thickness portion, the thickness of which decreases in accordance with a profile of the increasing-thickness portion, and
wherein, when a coordinate is defined along the rotational axis of the hub, the coordinate range of the core at least partly overlaps the coordinate range of a portion where the bearing unit touches the ring-shaped wall.

9. The rotating device according to claim 8, wherein the coils are formed so that a distance between the coils and the increasing-thickness portion is greater than a predetermined distance.

10. The rotating device according to claim 8, wherein the increasing-thickness portion is formed so that the hub maintains a predetermined height even if a test impact load of 1200 G is applied.

11. The rotating device according to claim 8, further comprising a ring-shaped thrust ring, the center of which is along the rotational axis of the hub, the ring-shaped thrust ring being fixed to the hub, and
the thrust ring has a substantially flat hub-facing surface that faces the hub in the direction along the rotational axis of the hub, and
a part of the hub-facing surface is in contact with the hub and the other part, when the hub rotates, suppresses the motion of the hub in the direction along the rotational axis of the hub in cooperation with the bearing unit.

12. The rotating device according to claim 11, wherein the thrust ring is made of a material, the hardness of which substantially is equal to that of the hub.

13. A rotating device, comprising:
a hub on which a recording disk is to be mounted;
a base rotatably supporting the hub via a bearing unit, the base having a ring-shaped wall that surrounds the bearing unit and that protrudes towards the hub;
a core fixed to the base, the core having a ring portion and a plurality of teeth that radially extend from the ring portion; and
coils wound around the plurality of teeth,
wherein a space above an increasing-thickness portion is filled with a gas, which includes a predetermined ratio of Helium,
wherein the base includes the increasing-thickness portion which is formed so that the less the distance between a part of the increasing-thickness portion and the ring-shaped wall is, the thicker the part of the increasing-thickness portion becomes and so that the following equation is satisfied:

$$\frac{H(x)}{H_0} \geq k\left(\frac{x}{x_0}\right)^{-1.2} \qquad \text{(equation 1)}$$

where x is a distance between a part of the increasing-thickness portion and a rotational axis of the hub, $x_0$ is a predetermined reference distance, $H(x)$ is a thickness of the increasing-thickness portion at the distance x, $H_0$ is a predetermined reference thickness, and k is a predetermined constant greater than zero,
wherein the base includes a coil-facing portion provided radially-outside and adjacent to the increasing-thickness portion, the coil-facing portion facing the coil in an axial direction and having a predetermined constant thickness,
wherein the coils have a decreasing-thickness portion, the thickness of which decreases in accordance with a profile of the increasing-thickness portion, and
wherein, when a coordinate is defined along the rotational axis of the hub, the coordinate range of the core at least partly overlaps the coordinate range of a portion where the bearing unit touches the ring-shaped wall.

14. The rotating device according to claim 13, wherein the coils are formed so that the distance between the coils and the increasing-thickness portion is greater than a predetermined distance.

15. The rotating device according to claim 13, wherein the increasing-thickness portion is formed so that the hub maintains a predetermined height even if a test pact load of 1200 G is applied.

* * * * *